United States Patent Office 3,282,786
Patented Nov. 1, 1966

3,282,786
NOVEL 16α-ETHYNYL-19-NOR-Δ$^{1,3,5(10)}$-ANDROSTATRIENES
Georges Muller, Nogent-sur-Marne, France, assignor to Roussel-UCLAF, Paris, France, a corporation of France
No Drawing. Filed Jan. 18, 1965, Ser. No. 426,369
Claims priority, application France, Jan. 24, 1964, 961,482
7 Claims. (Cl. 167—65)

The invention relates to novel 16α-ethynyl-19-nor-Δ$^{1,3,5(10)}$-androstatrienes of the formula

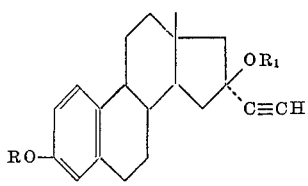

wherein R is selected from the group consisting of hydrogen, lower alkyl having 1 to 7 carbon atoms and an acyl radical of an organic carboxylic acid having 1 to 8 carbon atoms and R$_1$ is selected from the group consisting of hydrogen and an acyl radical of an organic carboxylic acid having 1 to 8 carbon atoms and to a process for their preparation. The organic carboxylic acids are such as alkanoic acids, alkenoic acids, cycloalkyl carboxylic acids, cycloalkyl alkanoic acids, arylalkanoic acids, aryl carboxylic acids, phenoxy alkanoic acids, heterocyclic carboxylic acids, β-ketoalkanoic acids. The invention also relates to novel compositions having hypocholesterolemiant activity and to a novel method of treating hypercholesterolemia in warm-blooded animals.

Known steroid compounds proposed for the treatment of hypercholesterolemia, such as 17α-ethynyl-estradiol and 3-methyl-16α-chloro-estrone, have a low hypocholesterolemiant/estrogenic activity ratio and the activities cannot be separated. The compounds of Formula I, on the contrary, possess hypocholesterolemiant activity at doses without estrogenic activity. Thus the estrogenic activity of 16α-ethynyl-19-nor-Δ$^{1,3,5(10)}$-androstatrien-3,16β-diol is about 500 times weaker than that of 17α-ethynyl-estradiol.

It is an object of the invention to provide the novel 16α-ethynyl-19-nor-Δ$^{1,3,5(10)}$-androstatrienes of Formula I.

It is another object of the invention to provide a novel process for the preparation of the 16α-ethynyl-19-nor-Δ$^{1,3,5(10)}$-androstatrienes of Formula I.

It is a further object of the invention to provide novel compositions possessing hypocholesterolemiant activity without estrogenic activity.

It is an additional object of the invention to provide a novel method of treating hypercholesterolemia in warm-blooded animals.

These and other objects and advantages of the invention will become obvious from the following detailed description.

The novel 16α-ethynyl-19-nor-androstatrienes of the invention have the formula

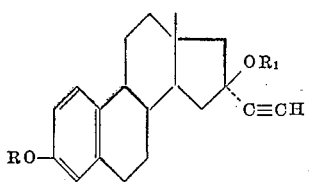

wherein R is selected from the group consisting of hydrogen, lower alkyl having 1 to 7 carbon atoms and an acyl radical of an organic carboxylic acid having to 1 to 8 carbon atoms and R$_1$ is selected from the group consisting of hydrogen and an acyl radical of an organic carboxylic acid having 1 to 8 carbon atoms.

The process of the invention for the preparation of 16α-ethynyl-19-nor-Δ$^{1,3,5(10)}$-androstatriene-3,16β-diol comprises reacting 19-nor-Δ$^{1,3,5(10)}$-androstatriene-3-ol-16-one with an ethynylation agent, preferably acetylene in the presence of an alkali metal such as potassium in an organic solvent such as tert.-amyl alcohol, to form the said product which can then be converted into the corresponding ether or esters, if desired.

3-lower alkoxy-16α-ethynyl-19-nor-Δ$^{1,3,5(10)}$-androstatriene-16β-ols can be formed by reacting 16α-ethynyl-19-nor-Δ$^{1,3,5(10)}$-androstatriene-3,16β-diol with a diazo lower alkane such as diazomethane or diazoethane or with a di-lower alkyl sulfate such as dimethylsulfate or diethylsulfate in the presence of an alkaline base. The 16-esters of said 3-lower alkoxy compounds can be formed by reacting 3-lower alkoxy-16α-ethynyl-19-nor-Δ$^{1,3,5(10)}$-androstatriene-16β-ol with an acylating agent of an organic carboxylic acid having 1 to 8 carbon atoms such as acetic acid anhydride, propionic acid anhydride or benzoic acid anhydride in the presence of p-toluene-sulfonic acid.

3,16β-diacyloxy-16α-ethynyl-19-nor-Δ$^{1,3,5(10)}$-androstatrienes can be formed by reacting 16α-ethynyl-19-nor-Δ$^{1,3,5(10)}$-androstatriene-3,16β-diol with an acylating agent of an organic carboxylic acid having 1 to 8 carbon atoms such as acetic acid anhydride, propionic acid anhydride or benzoic acid anhydride in the presence of p-toluene-sulfonic acid.

The novel compositions of the invention having hypocholesterolemiant activity are comprised of at least one 16α-ethynyl-19-nor-Δ$^{1,3,5(10)}$-androstatriene of the formula

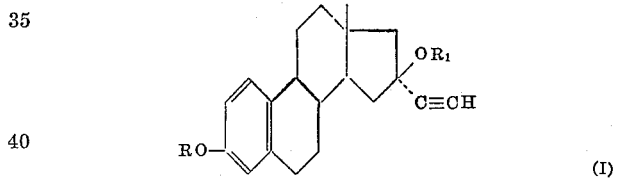

wherein R is selected from the group consisting of hydrogen, lower alkyl having 1 to 7 carbon atoms and an acyl radical of an organic carboxylic acid having 1 to 8 carbon atoms and R$_1$ is selected from the group consisting of hydrogen and an acyl radical of an organic carboxylic acid having 1 to 8 carbon atoms and a major amount of a pharmaceutical carrier. The compositions may be prepared in the form of injectable solutions or suspensions, in ampules and in multiple dose flacons or in the form of tablets, coated tablets, glossettes, of capsules and of suppositories prepared in the usual manner.

The compositions can be used as a preventive or curative agent for the treatment of hypercholesterolemia in arterial disturbances, cerebral arteritis, aortitis, coronaritis, angina pectoris and atheromatosis.

The novel method of treating hypercholesterolemia in warm-blooded animals comprises administering daily an effective dose of a 16α-ethynyl-19-nor-Δ$^{1,3,5(10)}$-androstatriene of the formula

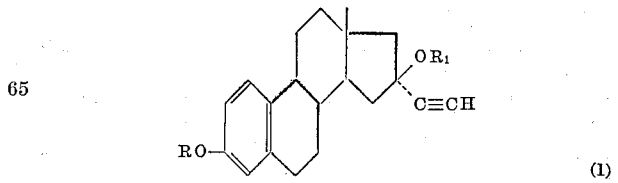

wherein R is selected from the group consisting of hydrogen, lower alkyl having 1 to 7 carbon atoms and an acyl radical of an organic carboxylic acid having 1 to 8 carbon atoms and $R_1$ is selected from the group consisting of hydrogen and an acyl radical of an organic carboxylic acid having 1 to 8 carbon atoms. The said compounds can be administered orally, perlingually, transcutaneously or rectally. The usual effective dose of 16α-ethynyl-19-nor-$\Delta^{1,3,5(10)}$-androstatriene-3,16β-diol is between 10 to 50 mg. per day depending upon the method of administration.

In the following example there is described a preferred embodiment to illustrate the invention. However, it should be understood that the invention is not intended to be limited to the specific embodiment.

EXAMPLE

*Preparation of 16α-ethynyl - 19 - nor - $\Delta^{1,3,5(10)}$-androstatriene-3,16β-diol.*—3 gm. of potassium were dissolved in 40 cc. of tertiary amyl alcohol at 100° C. under an atmosphere of nitrogen. The mixture was agitated for a period of 75 minutes and a stream of acetylene was then passed therethrough for a period of one hour. To 20 cc. of this solution, 1 gm. of 19-nor-$\Delta^{1,3,5(10)}$-androstatriene 3-ol-16-one was added under agitation at room temperature. A stream of acetylene was then passed therethrough for a period of three hours and after 10 cc. of dilute acetic acid were added, the mixture was taken up with an equal volume of water.

The aqueous alcoholic phase was extracted with methylene chloride and the methylene chloride extract was washed with normal sulfuric acid, with water, and with a solution of sodium bicarbonate. Then, the organic phase was dried over magnesium sulfate and distilled to dryness under vacuum. The residue obtained was dissolved in 10 cc. of ethanol and 1 gm. of Girard's reactant T and 1 cc. of acetic acid were added thereto. The mixture was heated to reflux for one hour, cooled and poured into 15 cc. of a normal solution of sodium hydroxide. The aqueous phase was extracted with methylene chloride and the organic extract was dried over magnesium sulfate and distilled to dryness under vacuum. The residue was taken up in hot isopropyl ether which upon cooling gave a yield of 390 mg. of a product melting at 225° C.

This product was purified by subjecting it to chromatography through alumina with elution with methylene chloride to obtain 190 mg. of 16α-ethynyl-19-nor-$\Delta^{1,3,5(10)}$-androstatriene-3,16β-diol in the form of a colorless, crystallized product. The said product was soluble in dilute aqueous alkalis and chloroform, slightly soluble in ether and insoluble in water. The said product had a melting point of 228–229° C. and had a specific rotation $[\alpha]_D^{20} = +106° \pm 5°$ ($c = 0.25\%$ dioxane). The chromatography of the mother liquors through alumina supplied a second yield of the said product.

*Analysis.*—$C_{20}H_{24}O_2$; molecular weight=296.39. Calculated: C, 81.04%; H, 8.16%; O, 10.80%. Found: 80.9; 8.3; 10.6.

This product is not described in the literature.

The starting coupound, 19-nor-$\Delta^{1,3,5(10)}$-androstatriene-3-ol-16-one was obtained according to the process described by Huffman et al. (J. Am. Chem. Soc., vol. 75, p. 4327 (1953)).

*Pharmacological study of 16α-ethynyl-19-nor-$\Delta^{1,3,5(10)}$-androstatriene-3,16β-diol*

(A) *Hypocholesterolemiant activity in the female rat.*— 16α-ethynyl-19-nor-$\Delta^{1,3,5(10)}$-androstadiene-3,16β-diol suspended in an aqueous liquid dispersant was administered for a period of 10 days orally to groups of female rats having an average weight of about 200 gm. at daily dosages of from 0.5 to 2 and 5 mg./kg. of the said product. On the eleventh day, the animals were sacrificed and a sample of blood was taken from each animal and the seric sterols were determined. The surrenales, liver and kidneys were separated and weighed and a determination of the hepatic sterols were made for certain groups of rats. The following table gives the results obtained.

TABLE I

| Lots | Doses | Seric Sterols g./1,000 | Hepatic Sterols g./1,000 | Surrenals mg. | Liver g. Percent g. | Kidneys mg. Percent g. | Change of Weight, Percent |
|---|---|---|---|---|---|---|---|
| Control | 0 | 0.67 | 2.40 | 56.0 | 4.56 | 807 | +10 |
| Treated Animals | 5 mg./kg | 0.25 (−63%) | 2.31 (−4%) | 56.8 (+2%) | 5.05 | 748 | +9 |
| Control | 0 | 0.64 | | 50.7 | 4.17 | 749 | +3 |
| Treated Animals | 2 mg./kg | 0.46 (−28%) | | 53.9 (+6%) | 4.16 | 774 | −1 |
| | 0.5 mg./kg | 0.62 (−3%) | | 53.9 (+6%) | 4.28 | 832 | +2 |

Table I shows that 16α-ethynyl-19-nor-$\Delta^{1,3,5(10)}$-androstatriene-3,16β-diol possesses an important hypocholesterolemiant action at a dose of 5 mg./kg. when administered daily orally for a period of 10 days and that it does not modify the hepatic sterols. Also, it is quite active at a dose of 2 mg./kg. On the other hand, the product has no unfavorable influence on the growth of the animals nor on the weight of the surrenals, liver and kidneys. In addition, the appearance of desmosterol blood was not observed. Therefore, the product does not possess estrogenic activity at the doses at which it possesses hypocholesterolemiant activity.

Various modifications of the compositions and process may be made without departing from the spirit or scope thereof and it is to be understood that the invention is to be limited only as defined in the appended claims.

I claim:

1. A 16α-ethynyl-19-nor-$\Delta^{1,3,5(10)}$-androstatriene of the formula

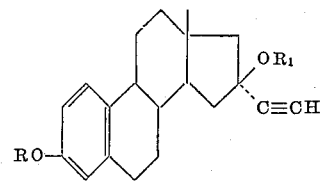

wherein R is selected from the group consisting of hydrogen, lower alkyl having 1 to 7 carbon atoms and an acyl radical of an organic carboxylic acid having 1 to 8 carbon atoms and $R_1$ is selected from the group consisting of hydrogen and an acyl radical of an organic carboxylic acid having 1 to 8 carbon atoms.

2. 16α - ethynyl-19-nor-$\Delta^{1,3,5(10)}$-androstatriene-3,16β-diol.

3. A composition having hypocholesterolemiant activity comprising a 16α-ethynyl-19-nor-$\Delta^{1,3,5(10)}$-androstatriene of the formula

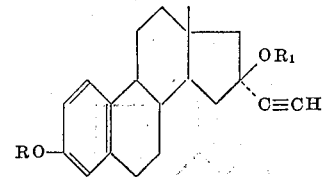

wherein R is selected from the group consisting of hydrogen, lower alkyl having 1 to 7 carbon atoms and an acyl radical of an organic carboxylic acid having 1 to 8 carbon atoms and $R_1$ is selected from the group consisting of hydrogen and an acyl radical of an organic carboxylic acid having 1 to 8 carbon atoms and a major amount of a pharmaceutical carrier.

4. The composition of claim 3 wherein the said 16α-ethynyl-19-nor-$\Delta^{1,3,5(10)}$-androstatriene is 16α-ethynyl-19-nor-$\Delta^{1,3,5(10)}$-androstatriene-3,16β-diol.

5. A method of treating hypercholesterolemia in warm-blooded animals which comprises administering daily to the animals an effective amount of a 16α-ethynyl-19-nor-$\Delta^{1,3,5(10)}$-androstatriene of the formula

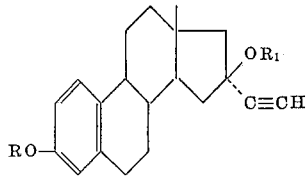

wherein R is selected from the group consisting of hydrogen, lower alkyl having 1 to 7 carbon atoms and an acyl radical of an organic carboxylic acid having 1 to 8 carbon atoms and $R_1$ is selected from the group consisting of hydrogen and an acyl radical of an organic carboxylic acid having 1 to 8 carbon atoms.

6. The method of claim 5 wherein the said androstatriene is 16α,ethynyl-19-nor-$\Delta^{1,3,5(10)}$-androstatriene-3,16β-diol.

7. A method of treating hypercholesterolemia in warm-blooded animals which comprises administering daily to the animals 10 to 50 mg. of 16α-ethynyl-19-nor-$\Delta^{1,3,5(10)}$-androstatriene-3,16β-diol.

References Cited by the Examiner
UNITED STATES PATENTS

| | | | |
|---|---|---|---|
| 2,843,609 | 7/1958 | Colton | 260—397.5 |
| 2,853,501 | 9/1958 | Hoehn et al. | 260—397.4 |

LEWIS GOTTS, *Primary Examiner.*

ELBERT L. ROBERTS, *Examiner.*

HENRY A. FRENCH, *Assistant Examiner.*